Aug. 25, 1936.   A. V. WALKER   2,052,373
VALVE
Filed Dec. 4, 1934

Inventor
Allen V. Walker.
by Orwig & Hague
Atty's

Patented Aug. 25, 1936

2,052,373

UNITED STATES PATENT OFFICE 2,052,373

VALVE

Allen Vinson Walker, Nashville, Tenn.

Application December 4, 1934, Serial No. 755,854

1 Claim. (Cl. 251—61)

This invention relates to an improved valve which is particularly adapted to be used in either high or low pressure gas pipes for closing the pipe against the movement of fluid through the pipe.

The object of my invention is to provide a valve of simple, durable and inexpensive construction which may be easily and quickly connected in the gas pipe and, when connected therein, to provide means whereby the flow of gas or other fluid through the pipe will be positively stopped when the valve is in a closed position, and to provide means whereby the valve may be moved entirely out of the fluid passage extending through the valve body when the valve is in an open position, so as to provide an unobstructed passage for the fluid, and to thereby decrease the pressure necessary to cause movement of the fluid through the pipe.

A further object of my invention is to provide, in a valve construction, an improved valve wherein the chance of leakage from the valve body during the time that the valve is in a partially open or closed position may be entirely eliminated without the use of complicated and expensive packing arrangement, and without the use of flexible packing.

A further object of my invention is to provide, in a valve construction, an improved valve arrangement whereby the valve has a tendency to clean its seat portion each time the valve is moved to closed position, and to grind itself into its seat to form a perfect fit.

More specifically, it is the object of my invention to provide a valve body having a fluid passage extending through the body and a valve opening transversing the fluid passage, the inner end of the valve opening terminating in a conical seat formed in the walls of the said passage, together with a suitable valve having one end formed conical to fit the seat, and to provide in connection therewith means whereby the valve will make a sliding fit to the walls of the valve opening to prevent escape of the gases or fluids from the valve chamber during the time that the valve is in a partially open or closed position, so as to eliminate the necessity of elaborate packing devices to prevent the escape of the gases or fluids around the valve stem.

My invention consists in the construction, arrangement and combination of the various parts of the device, whereby the objects contemplated are attained, as hereinafter more fully set forth, pointed out in my claim, and illustrated in the accompanying drawing, in which:

Figure 2:
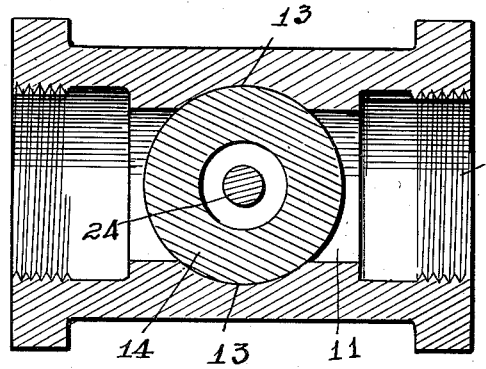
Figure 2 is a detail sectional view taken on the line 2—2 of Figure 1.
Figure 1:
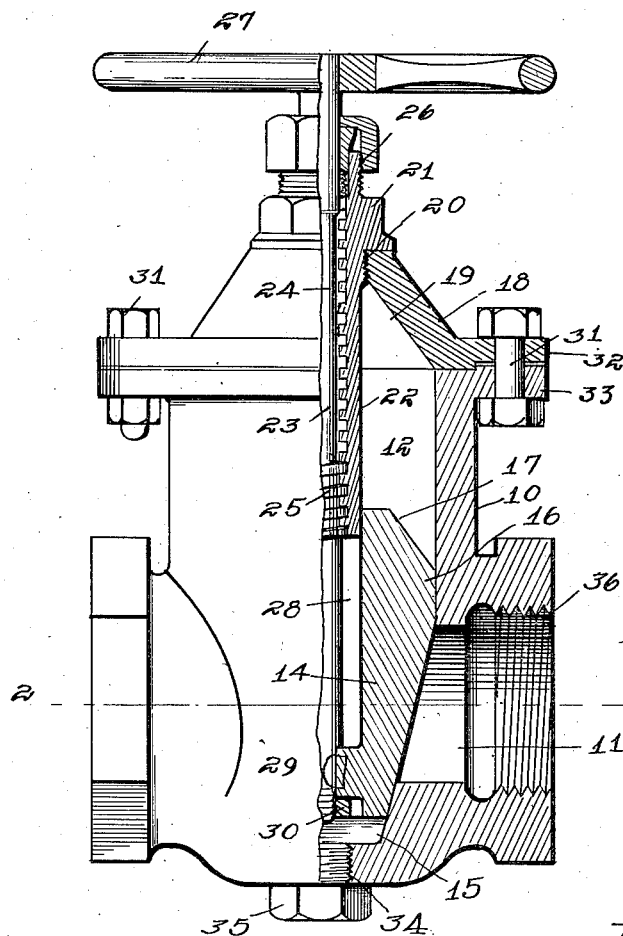
Figure 1 is a side elevation of my improved valve, a portion of which is shown in vertical section.

I have used the reference numeral 10 to indicate the valve body which is provided with a horizontally arranged fluid passage 11 and a vertically arranged valve opening 12, the said valve opening 12 intersecting the fluid passage. The walls of the passage 11 are provided with conical seat portions 13 for receiving the lower end of the valve 14, said lower end being formed conical to fit said seat portions, and in such a manner that the entire passage 11 is closed against movement of the fluid through said passage when the valve member 14 is at its lower limit of movement.

The lower end of the valve 14 terminates in a recess 15 formed in the bottom side of the member 10, said recess being a continuation of the conical seat portions 13. The opening 12 is formed cylindrical and adapted to receive the cylindrical portion 16 of the valve 14 immediately above its downwardly extending conical portion. The upper end of the portion 16 terminates in an upwardly extending conical portion 17.

The top side of the member 10 is provided with a detachable cover plate 18, the central portion of which is in the form of an upwardly extended truncated cone, the inner surface 19 of which forms a seat for the conical portion 17 of the valve 14 when the said valve is in its elevated position of movement.

The upper end of the member 18 is provided with a screw threaded opening 20 for receiving the bonnet 21, the under surface of which terminates in a downwardly extending sleeve 22, the inner surface of the sleeve 22 having screw threads 23 for receiving the threaded valve stem 24. The lower end of the valve stem 24 is provided with threads 25, while the upper end of said valve stem projects forwardly from the packing gland 26 formed in the upper end of the sleeve 22. The upper end of the stem 24 is provided with the usual hand wheel 27, by means of which the stem may be rotated, the rotation of which will cause the stem to move upwardly or downwardly through the sleeve 22.

The valve 14 is provided with a central longitudinal opening 28 for receiving the lower end of the sleeve 22, the lower end of the valve 14 being fixed to the lower end of the valve stem 24 by means of a key 29 and a nut 30, the lower end of the valve stem 24 extending downwardly through the opening 28.

By this arrangement it will be seen that if the valve stem 24 is rotated, then the valve 14 will also be rotated and either elevated or lowered, depending on which direction the said valve stem is rotated, and in such a manner that as the valve is moved to either of its seated positions, the valve will also be rotated, causing a rotary grinding movement to take place, sufficient to keep the seat members 13 and 19 clean and free of obstruction, and also serve to grind the valves in their seats. It will readily be understood, however, that this grinding effect is not of such an extent as to perceptibly wear away or destroy the valve seat, but, rather, just sufficiently to keep the surfaces clean, and true up the surfaces which might become bulged or otherwise deflected from the true conical surface either by contraction or expansion or chemical reaction.

By forming the member 16 cylindrical to engage the cylindrical inner surface of the member 10 means is provided whereby a constant fit is maintained between the valve member 16 and the inner surface of the wall 10 as the valve is moved from its closed position to its open position, and thereby prevent gases or other fluids from passing upwardly between the valve portion 16 and its coacting wall.

Further leakage is prevented by the conical portion 17 engaging the seat portion 19 when the valve is at its extreme upper position of movement.

The sleeve 22 is machined to slidably fit the walls of the opening 28, thus providing additional means for preventing the escape of fluid from the valve chamber around the valve stem. In order for any fluid to escape, it must pass upwardly between the member 16 and the inner surface of the wall 10, between the surfaces 17 and 19, between the sleeve 22 and the walls of the opening 28, thence upwardly through the screw threaded portion of the sleeve. It will readily be seen that a comparatively long path is thus provided, which in turn will offer very high resistance to the movement of gases or other fluid between said surfaces, which would greatly reduce the flow of gases or other fluid between said surfaces even if a loose fit between said members prevailed.

To further safeguard against any escape of fluid or gases while the valve is in its open or partially open positions, I have provided a packing gland 26 around the upper end of the stem 24, which is of the usual construction. This packing gland might be repacked with the valve member 15 in its open position, if so desired, without any perceptible loss of gas or fluid, even when the said gas or fluid is under a considerable amount of pressure.

Thus, by this arrangement it will be seen that under ordinary working conditions the valve could be operated without this packing gland, or without the use of any packing whatsoever, with the gases or fluids under low pressure.

The head 18 is detachably connected with the body 10 by means of bolts 31 projecting through the flanges 32 and 33 formed on the members 18 and 10, respectively, thus providing means whereby the plate 18 may be easily and quickly removed, together with the sleeve 22 and the valve 16, if so desired. Or the bonnet 21 may be removed from the plate 18, withdrawing the sleeve 22 from the valve chamber and from the valve 17.

The lower end of the body 10 is provided with a screw threaded opening 34 for receiving a drain plug 35.

Each end of the passage 11 is provided with a screw threaded portion 36, by means of which the valve may be connected to the screw threaded ends of suitable pipes in the usual manner.

Thus it will be seen that I have provided a valve of comparatively simple construction which may be easily and accurately machined, and in which the seat portions of the valve accurately fit the seat portions of the body and in which leakage is reduced to a minimum as the valve is either opened or partially opened.

I claim as my invention:

An improved valve comprising a valve body having a fluid passageway extended through it, the interior of the valve body being formed with a valve chamber characterized by having a true cylindrical interior and a tapered lower valve seat, a stationary sleeve projected downwardly into the interior of the valve and being screw threaded in its interior and having its outer surface in the form of a smooth cylinder, a valve stem having a screw threaded portion extended through said sleeve, and a valve fixed to said stem to rotate therewith, said valve being characterized by having a tapered lower end to form a tight fit with said lower valve seat, a cylindrical outer surface below its upper end to form a tight fit with the cylindrical inner surface of the valve chamber, and a cylindrical opening in its center to form a tight fit with said sleeve, said parts having such relative proportions that the valve will form a tight fit with both the interior of the chamber and the exterior of the sleeve at all positions of the valve within the valve chamber.

ALLEN VINSON WALKER.